United States Patent

[11] 3,632,328

| [72] | Inventors | Timothy Allen Gaskin<br>Marysville;<br>Robert Joseph Bell, West Mansfield, both of Ohio |
|---|---|---|
| [21] | Appl. No. | 664,616 |
| [22] | Filed | Aug. 31, 1967 |
| [45] | Patented | Jan. 4, 1972 |
| [73] | Assignee | The O. M. Scott & Sons Company<br>Marysville, Ohio |

[54] TURF APPEARANCE IMPROVEMENT
7 Claims, No Drawings

[52] U.S. Cl....................................................... 71/3
[51] Int. Cl......................................................... A01n

[50] Field of Search............................................. 71/3, 4,
DIG. 1, DIG. 3; 424/349

[56] References Cited
UNITED STATES PATENTS

| 3,076,700 | 2/1963 | Renner............................ | 71/29 |
| 3,158,534 | 11/1964 | Frohberger...................... | 424/349 |

*Primary Examiner*—James O. Thomas, Jr.
*Attorney*—Strauch, Nolan, Neale, Nies & Kurz ABSTRACT: A method of improving and extending turf color and otherwise improving turf appearance by concomitantly applying nitrogen-containing fertilizer and pentachloronitrobenzene to the turf. Compositions for use in practicing the method.

TURF APPEARANCE IMPROVEMENT

BACKGROUND, SUMMARY, AND OBJECTS OF THE INVENTION AND DETAILED DESCRIPTION OF EXEMPLARY PREFERRED EMBODIMENTS

Turf grasses are normally essential to the aesthetic value of the surroundings in which they are placed; and, in such settings, the attractiveness of the surroundings is dependent to a large extent upon the quality of the turf. Accordingly, ways of improving turf grass appearance by bettering its color, density, etc. are constantly being sought.

In conjunction with the foregoing most turf grasses become dormant and turn an unattractive color during the winter months (especially in areas where low temperatures prevail), and many turf grasses (particularly bluegrasses) similarly become more-or-less dormant in summer months during high-temperature low-moisture conditions. Accordingly, the provision of an aesthetically pleasing turf involves the problem of extending the desired color of actively growing turf into these seasons as well as that of improving color and the other attributes contributing to improved appearance during the growing season.

In the past, numerous methods have been used to enhance the appearance of turf during its active season with the principal method being the application of plant nutrients or fertilizer to improve turf density and color. Although the application of fertilizer brings a healthy color to active turf, its effects are greatly minimized or lost altogether when the climatic conditions which induce dormancy prevail.

To improve turf color during such periods (especially winter color) turf grasses are sometimes sprayed with a paint or dye. Here, disadvantages exist in that considerable skill is required to obtain uniform coverage with such a spray. In addition, the color is removed when the turf is mown as is sometimes required after the color of the turf is changed because of further growth. Also, use of paints and dyes is expensive, especially where large turf areas are concerned.

It has now surprisingly been found that a marked improvement in turf appearance can be obtained by applying nitrogen-containing fertilizer in conjunction with pentachloronitrobenzene (PCNB) and that the degree of improvement is much greater than would be predicted from the activity of the individual components alone. This method of improving turf appearance is free of the disadvantages appurtenant to previously known methods of improving turf appearance and, moreover, operates to improve turf appearance both during the seasons when the turf is actively growing and the seasons when the turf grasses are more-or-less dormant.

The combination of components just identified enhances turf appearance during the active season by supplying plant nutrients but the benefits of these nutrients are obtained to a greater extent than if the elements of the combination are applied alone as has heretofore been the case. Also, this combination further improves turf appearance during the active season by providing excellent protection against plant diseases and fungii, thereby eliminating the debilitating effect on appearance which these can produce.

Another important advantage of the present invention is that it extends the color of active turf into periods in which the turf would otherwise have assumed its dormant color. These periods include both the winter season and the high-temperature low-moisture summer season.

In addition, turf treated in accord with the present invention breaks dormancy earlier in the spring than would otherwise be the case and therefore can build a greater tolerance to adverse environmental conditions through a longer period of activity. This also results in a turf with better appearance.

The PCNB and nitrogen-containing fertilizer of the present invention are preferably incorporated into granular formulations so that they can be applied with a granular spreader. This eliminates the risks of spotting or streaking the turf appurtenant to sprays. Also, the granular compositions of this invention have long lasting effects, even though the turf to which the chemicals are applied is subsequently mown. Sprays in contrast tend to produce a useful effect for a much shorter period.

Suitable carriers for the PCNB and nitrogen-containing fertilizer include vermiculite, perlite, diatomaceous earth, clays, corncobs, and like materials. Diluents, stabilizers, surfactants, pesticides, flow enhancing agents, adhesives, dyes, and other adjuvants may be added to produce formulations which can be safely handled and which are convenient to apply uniformly and in accurate quantities to the area to be treated.

From the foregoing it will be apparent that one important and primary object of the present invention is the provision of novel, improved method of and compositions for improving turf appearance.

A related and also important but more specific object of the present invention is the provision of novel improved methods of and compositions for improving the appearance of turf during its active season.

Another related and important object of the invention is the provision of novel improved methods of and compositions for improving the appearance of turf by extending the color of the active turf into periods in which the turf otherwise becomes dormant and changes color.

A further related and important object of the invention is the provision of novel improved methods of and compositions for improving the appearance of turf by causing it to break dormancy earlier in the spring, thereby extending its active growing period so that it can develop a greater tolerance to adverse environmental conditions.

Further important, specific objects of this invention are to improve the appearance and quality of turf by the synergistic, concomitant application of pentachloronitrobenzene and nitrogen-containing fertilizer and to provide novel compositions by which these elements can be so applied.

Further important objects, additional important advantages, and other significant novel features of the present invention will become apparent from the appended claims and from the following detailed description of exemplary preferred embodiments of the invention.

The enhancement of turf appearance and quality in accord with the principles of this invention is illustrated in detail in the examples which follow. In these examples all parts are parts by weight unless otherwise indicated.

In conjunction with the foregoing, the examples are set forth primarily for the purposes of illustration and amplification. The specific enumeration of detail therein is accordingly not to be interpreted as limiting the appended claims unless expressly included therein.

EXAMPLE I

A granular nitrogen-containing fertilizer—PCNB formulation of the type contemplated by the present invention* (*Formulation A) and a granular formulation with PCNB as the only active ingredient ( Formulation B), both with the proportions tabulated below in table 1, were applied with a granular spreader to Kentucky bluegrass of poor color infected with leaf spot disease. Similar poorly colored, diseased infected turf was given an application of fertilizer alone, and additional poorly colored, disease-infected turf was left untreated to provide a check.

TABLE 1

| Ingredient | Formulation—Parts by weight | |
|---|---|---|
|  | A | B |
| Vermiculite | 692 | 5,000 |
| 21.0—4.5—4.5($N-P_2O_5-K_2O$ analysis) granular fertilizer | 5,000 |  |
| Polybutene | 259 | 540 |
| 75% pentachloronitrobenzene | 1,554 | 2,782 |

All applications made were at a rate which provided 2 pounds of pentachloronitrobenzene and 1.8 pounds of plant available nitrogen per 1,000 square feet of turf. Readings of color were taken during winter months 50 and 98 days after application and again in the early spring 157 days after application of the pentachloronitrobenzene and fertilizer. Readings on percentage of disease controlled were taken 157 days after application using the untreated turf as a standard.

The results are tabulated below with color readings gradiently represented by the numbers one through five. One is the poorest color and five is best color.

TABLE 2

| Treatment | Color | | | % Disease Controlled |
|---|---|---|---|---|
| | Days After Application | | | |
| | 50 | 98 | 157 | 157 |
| A | 3 | 4 | 5 | 90% |
| B | 2 | 2 | 2 | 90% |
| 23—7—7 (N—P$_2$O$_5$—K$_2$O analysis) fertilizer | 1 | 1 | 1 | 0 |
| Untreated turf | 1 | 1 | 1 | 0 |

As shown by the above data, the winter color of turf treated with pentachloronitrobenzene and fertilizer in accord with the principles of the present invention stayed consistently better than the color of turf treated with fertilizer alone or pentachloronitrobenzene alone throughout the entire winter and into the early spring. Moreover, the color of the turf treated in accord with the present invention had a higher rating in later winter and early spring (98 days and 157 days) than is attributable to the additive effects of pentachloronitrobenzene and nitrogen-containing fertilizer applied separately, showing that a marked synergistic effect is obtained by applying nitrogen-containing fertilizer and PCNB concomitantly in accord with the present invention.

The data in table 2 also shows that the color improvement and extension was accomplished at no expense to the disease-controlling capabilities of the PCNB. This is important because, as discussed above, the control of plant diseases is an important factor in the improvement of turf appearance.

EXAMPLE II

A granular formulation containing pentachloronitrobenzene and nitrogen-containing fertilizer and prepared in accordance with the principles of the present invention was applied with a granular spreader to Windsor Kentucky bluegrass infected with leaf spot. Similar turf infected with leaf spot was left untreated as a comparative check. The granular composition had the following formula:

TABLE 3

| Ingredients | Parts by Weight |
|---|---|
| 21.0—4.5—4.5 (N—P$_2$O$_5$—K$_2$O analysis) granular fertilizer | 5,000 |
| Vermiculite | 906 |
| Polybutene | 431 |
| 99% Pentachloronitrobenzene | 1,171 |

The formulation was applied at a rate providing nitrogen-containing fertilizer and PCNB per 1,000 square feet of turf at the rates shown in tables 4 and 5 below.

Readings were made on both the percentage of disease in the turf and turf color at 9 days and 178 days (early spring) after application, and readings of density were made for 176 days after application. The results tabulated below were computed from the foregoing readings using untreated turf as a standard.

TABLE 4

| Treatment | | % Disease | | % Density |
|---|---|---|---|---|
| lbs./1,000 square feet | | Days after application | | |
| PCNB | Nitrogen | 9 | 178 | 176 |
| 1 | 0.9 | 20 | 3 | 90 |
| 2 | 1.8 | 20 | 2 | 90 |
| Untreated turf | | 20 | 30 | 70 |

TABLE 5

| Treatment | | Color | |
|---|---|---|---|
| lbs.1 1,000 square feet | | Days After Application | |
| PCNB | Nitrogen | 9 | 178 |
| 1 | 0.9 | 3 | 5 |
| 2 | 1.8 | 3 | 5 |
| Untreated turf | | 3 | 1 |

The preceding tables show there is marked improvement in turf density as well as improvements in color and disease reduction and extension of color when nitrogen-containing fertilizer is applied to turf in conjunction with pentachloronitrobenzene in accord with this invention. In addition, these tables show that the novel compositions of this invention have an extremely long residual effect with the effects being still quite evident 178 days (6 months) after application.

The following example is further illustrative of the type of compositions contemplated by the present invention.

EXAMPLE III

| Ingredient | Parts by Weight |
|---|---|
| 22—0—0 (N—P$_2$O$_5$—K$_2$O analysis) granular fertilizer | 5,000 |
| Vermiculite | 468 |
| Hexylene Glycol | 497 |
| Ferrous sulfate heptahydrate | 280 |
| 75% Pentachloronitrobenzene | 3,255 |

Example IV below illustrates an exemplary method of preparing the formulations of the present invention such as those described in examples I–III.

EXAMPLE IV

Preparation of the Formulation of EXAMPLE II

Twenty-two hundred seventy-five grams of PCNB, 3.88 pounds of No. 4 expanded vermiculite, and 21.45 pounds of 21.0-4.5-(N—P$_2$O$_5$—K$_2$O analysis) fertilizer prepared as described in U.S. Pat. No. 3,076,700, Fertilizer Compositions and Process, were thoroughly mixed together. One liter of polybutene (currently available as "Polyvis OSH" from Cosden Oil and Chemical Company) was sprayed onto the resulting mixture to form a granular, dust free material having a final N—P$_2$O$_5$—K$_2$O analysis of 14–3–3.

As will be obvious to those skilled in the arts to which this invention relates, the proportions of the ingredients in the various formulations disclosed herein may be varied within certain limits for various applications of the present invention. The following table lists the preferred proportions of ingredients for the granular pentachloronitrobenzene, nitrogen-containing fertilizer compositions of the invention.

| Ingredients | Parts by Weight |
| --- | --- |
| Granular fertilizer | 5,000 |
| Carrier* | 468–906 |
| Solvent** | 259–497 |
| Other adjuvants | 0–280 |
| Pentachloronitrobenzene | 1,171–3,255 |

*Suitable carriers were described previously.

**The solvent may include or be a sticking agent such as polybutene or hexylene glycol or another of the sticking agents disclosed in U.S. Pat. Nos. 3,076,699 and 3,083,089 which are hereby incorporated by reference.

The formulations disclosed herein are preferably applied at rates providing from about 1 to about 2 pounds of pentachloronitrobenzene and from about 0.9 to about 1.8 pounds of plant available nitrogen per 1,000 square feet of turf per application.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing descriptions; and all changes which come within the meaning and range of equivalency of the claims are therefore intended to be embraced therein.

What is claimed and desired to be secured by Letters Patent is:

1. The method of improving the appearance and extending the color of turf comprising the step of concomitantly applying to the turf an effective amount of a nitrogen-containing fertilizer capable of supplying nitrogen in plant available form and pentachloronitrobenzene.

2. The method of claim 1, wherein the pentachloronitrobenzene is applied at a rate in the range of about 1 to about 2 pounds per 1,000 square feet of turf.

3. The method of claim 1, wherein the fertilizer is applied at a rate providing in the range of about 0.9 to about 1.8 pounds of plant available nitrogen per 1,000 square feet of turf.

4. The method of claim 6, wherein the pentachloronitrobenzene and the nitrogen-containing fertilizer are incorporated into a granular formulation and are applied to the turf by distributing said formulation substantially uniformly over the area to be treated.

5. The method of claim 1, wherein the nitrogen-containing fertilizer and pentachloronitrobenzene are applied by distributing substantially uniformly over the turf a composition comprising the following ingredients:

| Ingredient | Parts by Weight |
| --- | --- |
| Nitrogen-containing fertilizer capable of supplying nitrogen in plant available form | 5,000 |
| Carrier | 468–906 |
| Solvent | 259–497 |
| Adjuvants | 0–280 |
| Pentachloronitrobenzene | 1,171–3,255. |

6. The method of extending the color and improving the appearance of turf comprising the step of concomitantly applying to the turf about 1 to about 2 pounds of pentachloronitrobenzene per 1,000 square feet of turf and a nitrogen-containing fertilizer capable of supplying nitrogen in plant available form, said fertilizer being applied at a rate providing from about 0.9 to about 1.8 pounds of plant available nitrogen per 1,000 square feet of turf.

7. The method of claim 8, wherein said turf consists predominantly of bluegrass plants.

* * * * *

UNITED STATES PATENT OFFICE
CERTIFICATE OF CORRECTION

Patent No. 3,632,328     Dated January 4, 1972

Inventor(s) Timothy A. Gaskin et al.

It is certified that error appears in the above-identified patent and that said Letters Patent are hereby corrected as shown below:

Column 4, line 61, "21.0-4.5-($N-P_2O_5-K_2O$ analysis"

should read -- 21.0-4.5-4.5   ($N-P_2O_5-K_2O$ analysis) --.

Claim 7, line 1, "8" should read -- 6 --.

Signed and Sealed this

*twenty-second* Day of *June 1976*

[SEAL]

Attest:

RUTH C. MASON  
*Attesting Officer*

C. MARSHALL DANN  
*Commissioner of Patents and Trademarks*